Dec. 11, 1928.
M. HOFFMAN
1,694,943
INDICATOR FOR MOTION PICTURE PROJECTION APPARATUS
Filed March 30, 1927
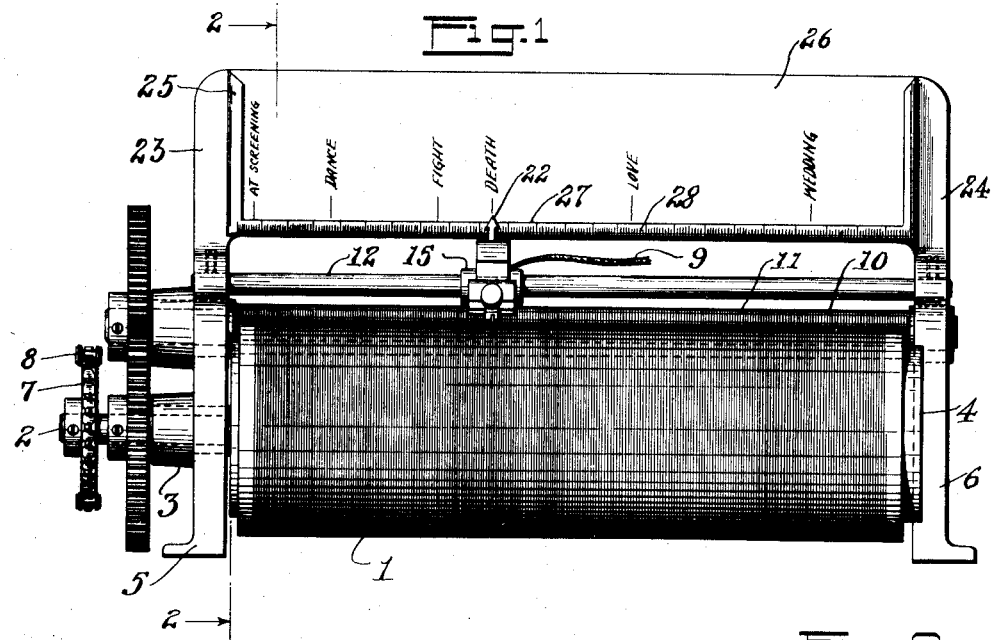
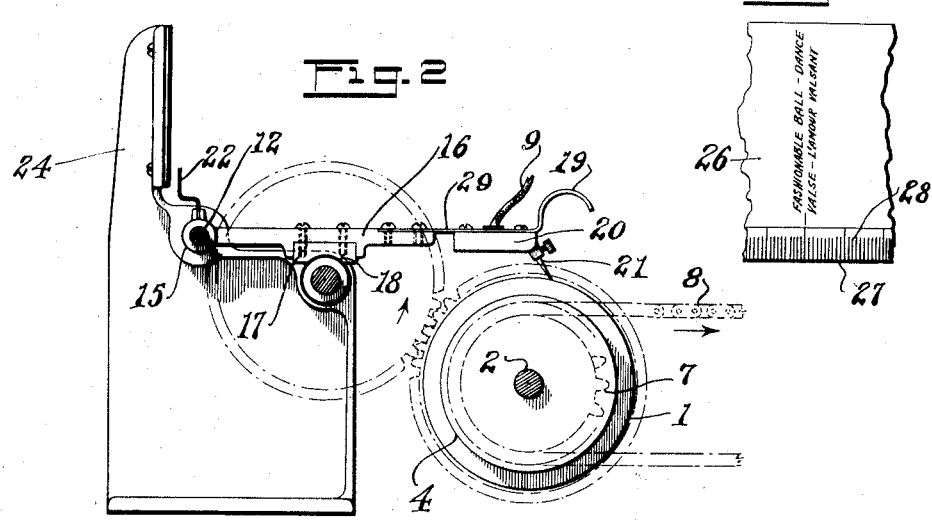
INVENTOR.
MICHAEL HOFFMAN
BY
ATTORNEY Patented Dec. 11, 1928.

1,694,943

UNITED STATES PATENT OFFICE.

MICHAEL HOFFMAN, OF BROOKLYN, NEW YORK.

INDICATOR FOR MOTION-PICTURE PROJECTION APPARATUS.

Application filed March 30, 1927. Serial No. 179,523.

This invention relates to the art of motion pictures, and one of the objects thereof is to provide new and improved means, whereby the musical score produced to accompany a screened play or performance, or various acts or scenes, and whereby either the spoken or singing voices of the actors may be more accurately co-related or co-ordinated to the projected play, acts or scenes or parts of a play or performance, then has obtained in devices or machines as hitherto constructed.

Another object of the invention is to provide new and improved means for co-relating or co-ordinating the audible accompaniment to the scenes or acts being portrayed on the screen when music or vocal expressions of actors are being mechanically reproduced.

More particularly, my invention contemplates the provision of means associated with sound reproducing apparatus and preferably located in the booth occupied by the operator of the projecting apparatus, whereby the latter can manpulate the machine so as to more accurately co-ordinate a musical score or vocal expressions to the screened features of the film, than has obtained in machines or devices hitherto constructed.

Other objects and aims of the invention, more or less specific than those referred to above, will be in part obvious and in part pointed out in the course of the following description of the elements, combinations, arrangements of parts and applications of principles, constituting the invention, and the scope of protection contemplated will be indicated in the appended claims.

In the accompanying drawings, wherein I have illustrated a preferred form of embodiment of my invention, Figure 1 is an elevational view of my improved device;

Figure 2 is a transverse sectional view thereof, taken on the line 2—2 of Figure 1, looking in the direction of the arrows; and Figure 3 is an elevational view upon an enlarged scale of a portion of the device.

Before proceeding to describe the structural characteristics of the present form of embodiment of my invention, it may here be noted that in a present employed method of mechanically reproducing an accompanying musical score or vocal expression of actors to a screened play or acts or scenes thereof, the audible expressions whether musical or otherwise, are recorded upon a master cylinder or disk simultaneously with the production of the film, the sound recording apparatus being connected to and operating synchronously with the projecting apparatus, whereupon when the duplicated sound records are distributed with the films to the various theatres, and are used in similarly constructed and synchronously operating projecting and sound reproducing apparatus, the screened film and the accompanying audible expressions will be co-related or co-ordinated in the identical manner in which the original music was co-ordinated with the filming of the picture.

In apparatus as it present constructed, the sound reproducing apparatus as hereinbefore indicated, is preferably located in the booth occupied by the operator or operators of the projecting machine and under his or their control, the reproduced sound being preferably amplified by a device located in proximity to the screen.

The mechanism as hitherto constructed, is open to the objection that on frequent occasions, the operator of the projecting machine, is required to subtract or cut out footage from the film, by reason of defective or damaged film length, or from other causes, such as requirements of censorship, or to insert film footage into a reel by reason of change of titles or like causes. This, of course, varies the pre-determined and established relationship between the sound record and the film, whereby the musical score or audible expressions are no longer co-ordinated with the film. Moreover, if for any other reason the relation between the features of the screened picture and the audible accompaniment thereto becomes deranged or destroyed, there has hitherto been no efficient method of re-coordinating the features displayed on the screen with the audible accompaniment during the screening of the picture.

In the mechanism which I shall now proceed to describe, the above and other defects are eliminated, and a device provided whereby the sound reproducing apparatus and the projecting apparatus may be at all times maintained in co-ordinated relation; and whereby if the pre-determined relationship between those instrumentalities is destroyed, such relationship may be quickly and accurately restored.

Referring now to the drawings, wherein similar reference characters refer to similar parts throughout the several views thereof, the reference numeral 1 denotes, in the present instance, a cylinder upon which the musical score or audible expression designed for particular filmed pictures has been recorded. This cylinder is, in the present instance, mounted upon a shaft 2 journaled in bearings 3 and 4 provided in suitable standards 5 and 6. Mounted upon the shaft 2 is, in the present instance, the sprocket wheel 7, upon which runs a chain 8, the latter being adapted to be connected with a driving sprocket mounted upon a suitable shaft carried by the projecting apparatus (not shown). It is understood that the chain 8 will drive the cylinder 1 at a speed proportionate to the speed of the movement of the film past the lens of the projecting apparatus, and that this pre-determined relationship between the speed of the film and that of the sound reproducing cylinder will be the same as that obtaining when the sound was recorded at the production of the picture as above described. In other words, this sound reproducing cylinder and the movement thereof, are synchronized with the projecting apparatus in the same manner as were the master sound recording cylinder and the film at the time the musical score or audible expression was recorded on said master cylinder.

It is intended that the sound reproducing apparatus shall be located in the booth of the operator of the projecting apparatus, and under his control, the sound reproduced being amplified by a suitable device located in proximity to the stage or screen, as by well known means; the reproduced sound impulses being in the present instance, electrically conducted to the amplifying device as by means of the cable 9.

Suitably journaled at its opposite ends in the frame provided by the standards or uprights 5 and 6, is a threaded shaft 10, the threads of the latter, in the present instance, in pitch and number, having a pre-determined relation to the grooves of the sound reproducing cylinder 1.

The reference numeral 12 denotes a rod suitably mounted at its outer ends in the frame provided by the uprights 5 and 6. This rod which extends lengthwise of the machine and in parallel relation to the threaded shaft 10, forms a support for a bracket 15, the latter being adapted to slide upon this rod. The bracket 15 is provided with a forwardly extending arm 16 which carries a block 17, the latter having a threaded face 18, the threads of which mesh with the threads 11. The threads of the block 18 and those of the threaded shaft 11 are normally maintained in mesh by gravity. These threads may, however, be readily disengaged by swinging the arm 16 upwardly as by means of the handle 19 mounted upon the outer end of the arm 18. This arm 16 is provided with a usual form of sound reproducing apparatus indicated generally at 20 comprising the usual needle 21 which is adapted to traverse the grooves of the sound reproducing cylinder 1.

The bracket 15 is provided with an indicator 22. Carried by the upwardly extending arms 23 and 24 rising from the uprights 5 and 6, is a frame 25 adapted to receive a chart 26 which may be inserted in suitable grooves provided therein. The indicator 22 when moved along the rod 12 by the means already described, is adapted to co-operate with notations provided upon the chart 26 in the manner hereinafter to be described.

Provided upon a longitudinally extending rail or strip 27 forming a portion of the frame 25, is a scale 28. The distance between the lines of this scale bear a predetermined relation to the film and to the threads of the shaft 10, that is to say, the parts of the machine are so corelated and arranged that when a certain length of film has been caused to pass the lens of the projecting apparatus, the indicator 22 shall have moved a pre-determined distance over the scale 28.

It may here be noted that the major part of the weight of the arm 16 and its associated parts, is carried by the screw threaded shaft 11, the sound box 20 and its associated parts being carried upon the bracket arm by yieldable support, such as a spring 29, whereby the pressure exerted by the needle 21 upon the surface of the cylinder may be regulated, to the end that the needle will not cause excessive wear of the cylinder.

It may also be noted that in the reproducing apparatus, the threaded shaft 10 may also be omitted in certain instances, since the indicating device may be moved along by the engagement of the needle with the grooves of the cylinder 1. I prefer, however, to employ positive mechanical means, such as the threaded shaft 10 to move the indicating means, so as to minimize damage to the sound reproducing cylinder, such as might be caused by frequently lifting the needle therefrom and engaging it therewith.

Referring now to the chart member 26, this member comprises a suitably shaped sheet adapted to fit nicely in the grooves of the frame 25, so as to be held against relative longitudinal movement with respect to the indicator 22.

A chart similar to this chart 22 is prepared by a skilled observer at the original screening or production of the film together with the production of the audible expressions, sounds or musical score, the latter being recorded on a master cylinder simultaneously with the production of the picture. This skilled observer viewing the scene to be portrayed and hearing the simultaneously produced aforesaid audible expressions, sounds or musical score, then being recorded, notes on a then blank chart positioned in the sound recording machine, the various features, acts or scenes being enacted, said notations being made at points on the chart directly opposite the indicator 22. In other words, this observer follows the course of the indicator as it travels from left to right across the chart and makes such notations thereon as thereafter can be followed by an operator of the projecting machine.

Having made these notations, a finished chart is then prepared and printed, the final notations thereon maintaining the same relative position as regards the movable indicator as did the initial notations made by the observer.

It will be understood, of course, that finished charts are cut to the exact relative size of the chart untilized in the production of the film and the accompanying audible expressions, sounds or musical selections, so that when said finished charts are positioned in the frame of another similarly constructed machine, the indicator thereof in its movement along the chart will give a correct indication of the scenes, acts and other features of the film, as well as the audible expressions, sounds or musical selections produced at the aforesaid initial production of the combined visual and audible performance.

The finished charts which, for the purpose of this specification, may be termed "cue" charts, are thereafter distributed with the films and sound reproducing records, to the various theatres or places wherein the film and sound reproducing devices are to be utilized.

It will be understood, of course, that in carrying out this invention, the projecting apparatus and the sound reproducing apparatus are operated in synchronism, the indicator automatically moving over the prepared chart, and in so moving, said indicator will also be moved over the scale provided on the rail or strip 27, which scale has been described as constructed to indicate the footage of film being moved past the lens of the projecting apparatus. Should a portion of the film having been cut out or if for any other reason the sound reproducing mechanism becomes uncoordinated with the features of the picture being displayed on the screen, the operator has merely to disengage the needle from the sound reproducing record and move it to such a position that when re-engaged with the sound reproducing record, re-coordinance between sound and picture will be established. The chart 26, as well as the scale 28 will be utilized by the operator in the performance of this operation.

It will accordingly be seen that I have provided an apparatus well adapted, to attain, among others, all the ends and objects above pointed out, in a most efficient manner.

Through the use of the device which forms one of various embodiments of my invention, the problem of maintaining a constant co-ordinance between the film features and the sound reproducing apparatus is greatly simplified. While in the present description of my invention, I have included the same as applicable to what is known as talking pictures, the same is applicable to the motion picture projecting art, wherein it is merely necessary to co-ordinate the pictorial features displayed on the film with the musical score, that is to says, screened productions wherein the audible features are limited to a playing of selections appropriate to the acts, scenes or features being portrayed on the screen.

When it is desired to provide a cue chart wherein it is necessary only to indicate the musical score, this chart is outlined at a pre-screening of the film, the observer noting on the blank chart, the various features of the screen production, to which appropriate accompanying music will be required to be played in the screened production. This cue chart will not be required to be produced simultaneously with the screening of the original film, but as above indicated can be prepared at a preview of the screening of said film.

It will be apparent that the use of my invention greatly minimizes the labor of operating apparatus now employed to synchronize a filmed production with audible expression or a musical score, and at the same time works greatly to establish and maintain more perfect co-ordination between the screened picture and the audible accompaniment thereof.

As many changes could be made in this construction without departing from the scope of the following claims, it is intended that all matter contained in the above description, or shown in the accompanying drawing, shall be interpreted as illustrative only and not in a limiting sense.

Having thus described my invention, what I claim as new and desire to secure by Letters Patent, is:—

1. In apparatus of the class described, in combination, sound reproducing apparatus operated synchronously with apparatus adapted to project motion pictures upon a screen, means associated with said sound reproducing apparatus and synchronously operated thereby adapted to give a visual indication of the pictorial features being projected upon a screen, comprising a chart bearing indicia of the features of said motion pictures and an indicator cooperating with said chart, and means for simultaneously adjusting the indicating means and said sound reproducing apparatus with respect to the pictorial features of screened production.

2. In apparatus of the class described, in combination, sound reproducing apparatus operated synchronously with motion picture projecting apparatus whereby sounds reproduced will bear a definite relation with the pictorial features being projected upon the screen, indicating means associated with said sound reproducing apparatus and driven synchronously by the latter for giving a visual indication of the character of the pictorial features being projected upon the screen, and means for varying the indicating relation between the indicator and the pictures being projected upon the screen, and for simultaneously varying the relation between the sound reproducing apparatus and the pictures being projected.

3. In apparatus of the class described, in combination, sound reproducing apparatus operated synchronously with moving picture projecting apparatus whereby sounds reproduced will bear a definite relation to the pictorial features being projected upon the screen, indicating means synchronously driven with said sound reproducnig apparatus providing a visual indication of the character of the pictures being projected upon the screen, said indicating means comprising a cue chart having characters indicative of illustrative or descriptive features of the film being screened and an indicator cooperating with said chart to provide the said indication, and means for manually simultaneously changing the relative position of the indicator and said reproducing apparatus with respect to the pictures being projected upon the screen.

4. In apparatus of the class described, in combination, sound reproducing apparatus operated synchronously with apparatus for projecting motion pictures upon a screen, means synchronously driven with said sound reproducing apparatus for indicating visually the pictorial features being projected upon the screen, and means whereby the indicating relation of said last named means and said sound reproducing apparatus with respect to the motion pictures being projected may be simultaneously varied at will.

5. In apparatus of the class described, in combination, sound reproducing apparatus operated synchronously with a motion projecting machine, so that appropriate sounds may be produced simultaneously with the projection of the pictorial features upon a screen by said motion picture projecting mechanism, means synchronously driven with said sound reproducing apparatus providing a simultaneous visual indication of the pictorial features being projected upon the screen, said means comprising a cue chart and an indicator movable thereover, and means whereby the relation of indicator and said reproducing apparatus relative to the pictures being projected by the motion picture projecting machine may be simultaneously varied at will without disturbing the normal operation of the latter.

In testimony whereof, I affix my signature.

MICHAEL HOFFMAN.